Jan. 16, 1968   J. B. THOMPSON   3,363,497
RECORDER
Filed Sept. 21, 1966

INVENTOR.
JOSEPHUS B. THOMPSON
BY
ATTORNEY.

United States Patent Office 3,363,497
Patented Jan. 16, 1968

3,363,497
RECORDER
Josephus B. Thompson, Covington, Ohio, assignor to The Grossman Music Corporation, Cleveland, Ohio, a corporation of Ohio
Filed Sept. 21, 1966, Ser. No. 581,099
2 Claims. (Cl. 84—380)

ABSTRACT OF THE DISCLOSURE

A recorder having a thumb guide on the underside of its body adapted to accommodate any size hand, and two, opposed, crescent-shaped anti-roll rests spaced longitudinally therefrom.

This invention relates to musical wind instruments, and particularly to recorders.

The recorder, or "block flute," is a basic musical instrument. It is actually the fore-runner of the original orchestra flute and dates back to the 13th century.

For some years now, the recorder has been undergoing a renaissance. With the present world-wide rebirth of baroque music, the recorder is rapidly assuming great popularity in the music world.

In order to provide a better understanding of the invention, it may be well to point out that the recorder is made up of four basic parts, or sections; namely, a body section, a bell section, a barrel section and a mouth-piece section, all joined end-to-end through telescopable joints to provide a wind instrument having a continuous wind passage.

In tuning the instrument, the barrel section must be free to be moved axially of the body section to change the overall length of the wind passage by small increments.

Heretofore, in order to make the joints air-tight it has been the practice to provide the joints with sealing means in the form of cork, thread or other wrappings which eventually work loose or wear out, permitting air-leakage at the joints, which adversely effects the true intonation of the instrument.

The primary object of the invention, therefore, is to provide a recorder having telescopable joints that require no separte sealing means.

Another object is to provide a recorder whose telescopable joints have a plurality of spaced ridges which slidably interfit a smooth walled bore, in the manner of a series of piston rings, which make the instrument completely air-tight, while permitting free axial movement of the several inter-connected sections.

Still another object is to provide a musical instrument of the type stated, having an elongated, serrated, thumb-guide on the underside thereof which extends at least 25% the length of its body section to comfortably accommodate any size hand.

A further object is to provide a recorder whose barrel section has two spaced and opposed crescent-shaped rests positioned on the underside thereof, to prevent the instrument from rolling off a desk or stand, when not in use.

These, and other objects of the invention, will become apparent from a reading of the following specification and claims, together with the accompanying drawing, wherein like parts are referred to and indicated by like reference numerals, and wherein:

Figures 1, 2, 3:
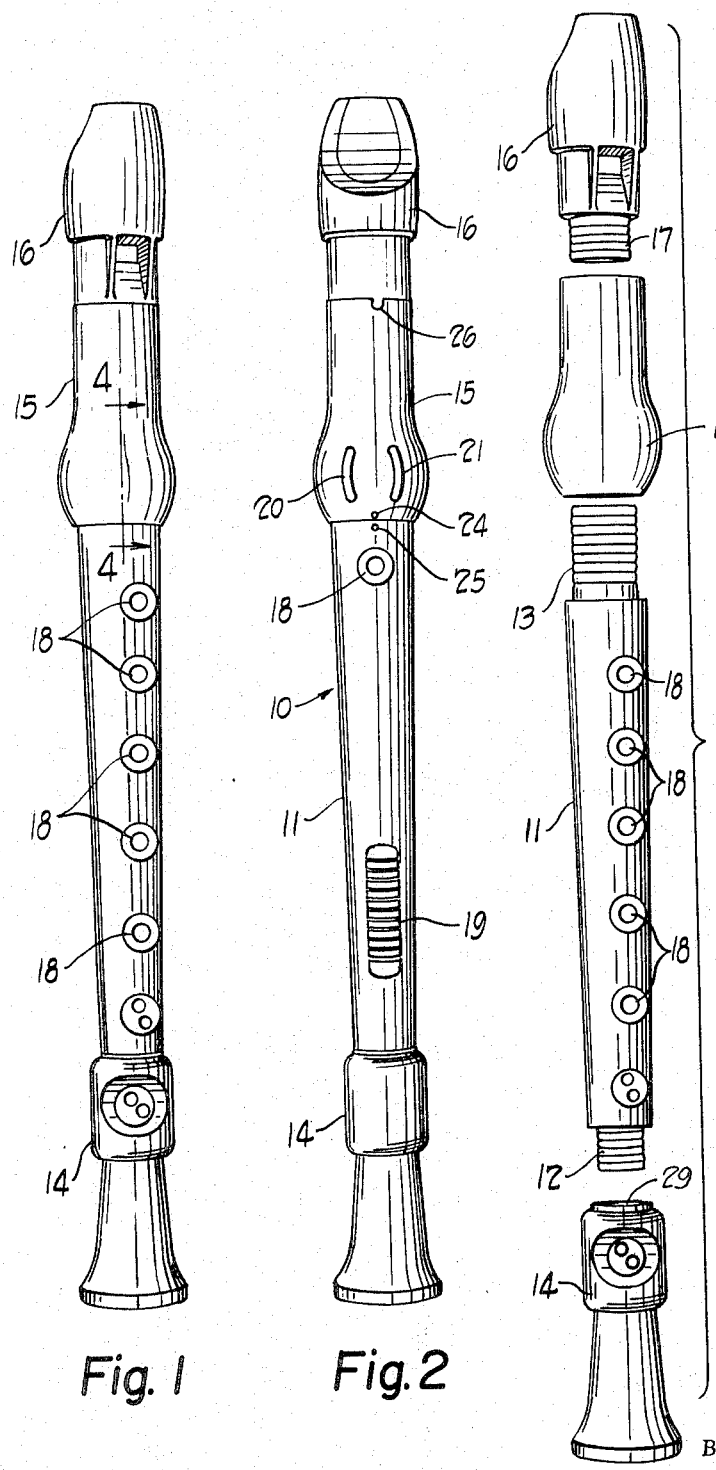
FIGURE 1 is a top elevational view of the recorder that is the subject of the invention.
FIGURE 2 is a bottom elevational view of the same.
FIGURE 3 is an exploded view of the recorder illustrated in FIGURE 1.

Referring more particularly to the drawing, there is seen in FIGURE 1 the recorder, that is the subject of this invention, broadly indicated by reference numeral 10.

While the recorder has traditionally been made of wood, in the preferred form, illustrated here, it is molded from a suitable plastic possessing the acoustical properties required for true recorder sound. The use of plastic provides a recorder that is sanitary, moisture-proof, and easily washable.

As seen in FIGURE 3, the recorder 10 is made up of 4 sections in the traditional manner, namely, a body 11, a bell 14, a barrel 15, and a mouth-piece 16; all with axial bores therethrough, which, when the several sections are joined end-to-end, form a continuous, straight, wind passage extending from the bell 14 through to the mouth-piece 16.

Reference numerals 12, 13 and 17 indicate male joint elements formed integral with, and extending axially of both ends of the body section 11, and the wind-passage end of the mouth-piece 16.

Figure 5:
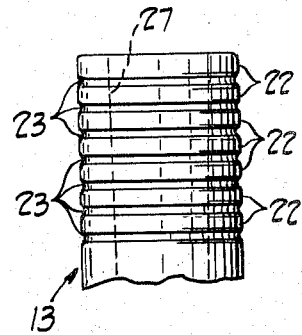

As seen most clearly in FIGURE 5, each male joint element 12, 13 and 17 is right-cylindrical in shape with a plurality of axially spaced circular grooves 23 in the outer surface thereof which define a plurality of spaced circular ridges, or rings, 22.

Figure 4:
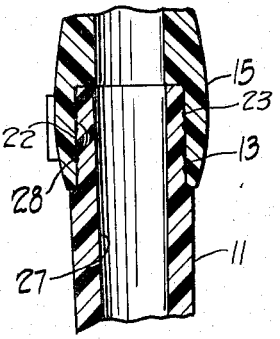
FIGURE 4 is a sectional view of the joint between the body and barrel sections, taken along the line and in the direction of the arrows 4—4 of FIGURE 1; and, FIGURE 5 is an enlarged perspective view of a portion of one of the male joint elements.

The barrel section 15 has a female joint element at both ends thereof in the form of open-ended, smooth-walled, bore sockets 28, as seen most clearly in FIGURE 4. The bell section 14 also has a female joint element, or socket, 29, as again seen in FIGURE 3.

The several sections are joined together by telescopically inserting the male joint elements into the female joint elements, as seen in FIGURE 4, to provide the assembled instrument seen in FIGURES 1 and 2.

The diameter of the male joint elements is such that, when fitted into the female joint elements, the ridges 22 of the male elements interfit the female element bores in the manner of piston rings, to provide an air-tight joint.

The presence of a plurality of rings 22 insures an air-tight fit at all times, since leakage past one ring will be stopped by adjacent rings. Thus no supplementary packing materials, that may fail with use, are required.

The male joint element 13, of the body section 11, which interfits the barrel section female joint element 28 is of a length to allow the barrel section to be moved axially thereof to provide the necessary adjustment required for tuning the recorder. The presence of a plurality of sealing ridges 22 assures an air-tight joint in all possible positions of the barrel section 15.

The body and bell sections have the usual tone-holes 18, which are selectively covered by the fingers, in playing the instrument.

Reference numeral 19 indicates an elongated, ridged, thumb-guide, positioned on the underside of the body section 11, which extends approximately 25% the length thereof, to comfortably accommodate any size hand. This makes the instrument easier to play than the traditional recorder, which has a small thumbguide, adapted to fit only one, arbitrarily selected, size hand.

Reference numerals 20 and 21 indicate spaced and opposed crescent-shaped rests molded into the under-surface of the barrel section 15, on opposite sides of its center-line, which act to prevent the recorder from rolling when it is placed on a flat surface, such as a desk top or stand. The crescent configuration of the rests 20 and 21 provides infinitely more resistance to rotational forces than that provided by the conventional straightline rest.

Proper assembly of the mouth-piece and barrel is assured by the use of interlocking tongue and groove 26, while proper alignment between the body and barrel sections, while tuning, is assured by the alignment of raised dots 24 and 25 located on the underside of the barrel and body, as seen in FIGURE 2.

I claim:
1. A recorder of the type described, comprising:
 (a) a tubular body section provided with a plurality of tone-holes disposed generally of the upper side thereof;
 (b) a hollow barrel, tuning, section;
 (c) a mouth-piece section; and,
 (d) a bell section; the several sections being joined, end-to-end, through telescopable male and female joint elements, formed integral with each of said sections, to provide a musical wind instrument of the type described, having a continuous, straight, wind passage;
 (e) and, a longitudinally extending serrated thumb-guide, located on the underside of the body section, extending approximately 25% the length thereof.
2. A recorder, as in claim 1, wherein the barrel section has two spaced and opposed crescent-shaped rests, on the underside thereof, positioned on opposite sides of its longitudinal center-line.

References Cited

UNITED STATES PATENTS

| | | | |
|---|---|---|---|
| 2,598,268 | 5/1952 | Kendrick | 84—380 |
| 2,847,892 | 9/1955 | Laas et al. | 84—380 |

FOREIGN PATENTS

| | | |
|---|---|---|
| 3,183 | 1808 | Great Britain. |
| 665,757 | 1/1952 | Great Britain. |

RICHARD B. WILKINSON, *Primary Examiner.*

CHARLES M. OVERBEY, MICHAEL MARA,
*Assistant Examiners.*